United States Patent
Zhu

(10) Patent No.: US 12,400,298 B2
(45) Date of Patent: Aug. 26, 2025

(54) IMAGE FUSION METHOD AND APPARATUS, STORAGE MEDIUM AND MOBILE TERMINAL

(71) Applicant: JRD COMMUNICATION (SHENZHEN) LTD., Guangdong (CN)

(72) Inventor: Xiaopu Zhu, Guangdong (CN)

(73) Assignee: JRD COMMUNICATION (SHENZHEN) LTD., Guangdong (CN)

(*) Notice: Subject to any disclaimer, the term of this patent is extended or adjusted under 35 U.S.C. 154(b) by 142 days.

(21) Appl. No.: 17/906,465

(22) PCT Filed: Apr. 27, 2020

(86) PCT No.: PCT/CN2020/087209
§ 371 (c)(1),
(2) Date: Sep. 15, 2022

(87) PCT Pub. No.: WO2021/184496
PCT Pub. Date: Sep. 23, 2021

(65) Prior Publication Data
US 2024/0233083 A1    Jul. 11, 2024

(30) Foreign Application Priority Data
Mar. 17, 2020  (CN) .......................... 202010187708.8

(51) Int. Cl.
*G06T 5/50*    (2006.01)
(52) U.S. Cl.
CPC ...... *G06T 5/50* (2013.01); *G06T 2207/20216* (2013.01); *G06T 2207/20221* (2013.01)

(58) Field of Classification Search
None
See application file for complete search history.

(56) References Cited

U.S. PATENT DOCUMENTS

| 5,715,377 A | * | 2/1998 | Fukushima | .......... | H04N 1/6086 |
| | | | | | 358/1.9 |
| 10,311,579 B2 | * | 6/2019 | Yun | .......... | G06V 10/28 |

(Continued)

FOREIGN PATENT DOCUMENTS

| CN | 102422124 A | 4/2012 |
| CN | 104320575 A | 1/2015 |

(Continued)

OTHER PUBLICATIONS

International Search Report in International application No. PCT/CN2020/087209, mailed on Dec. 21, 2020.

(Continued)

*Primary Examiner* — Soo Shin
(74) *Attorney, Agent, or Firm* — PV IP PC; Wei Te Chung

(57) ABSTRACT

An image fusion method and apparatus, a storage medium and a mobile terminal. The method comprises: acquiring multiple continuously captured preview images when a mobile terminal starts up a dynamic image capture mode; determining a main grayscale image and a background grayscale image corresponding to each preview image; determining, according to the main grayscale image and the background grayscale image, a brightness adjustment parameter of the corresponding preview image; and fusing the multiple preview images according to the brightness adjustment parameters.

14 Claims, 4 Drawing Sheets

(56) References Cited

U.S. PATENT DOCUMENTS

| | | | |
|---|---|---|---|
| 2005/0036709 A1 | 2/2005 | Imai | |
| 2005/0141002 A1 | 6/2005 | Takano et al. | |
| 2008/0143739 A1 | 6/2008 | Harris et al. | |
| 2012/0002082 A1* | 1/2012 | Johnson | G06T 7/32 348/E9.053 |
| 2012/0219211 A1* | 8/2012 | Ding | G06V 10/462 382/159 |
| 2012/0268350 A1 | 10/2012 | Yoshimura | |
| 2013/0294683 A1* | 11/2013 | Yamashita | G06T 15/00 382/154 |
| 2015/0319424 A1* | 11/2015 | Haimovitch-Yogev | H04N 13/204 348/48 |
| 2018/0082454 A1* | 3/2018 | Sahu | H04N 23/83 |
| 2021/0104014 A1* | 4/2021 | Kolb, V | G06T 3/4053 |

FOREIGN PATENT DOCUMENTS

| | | |
|---|---|---|
| CN | 104978722 A | 10/2015 |
| CN | 105551061 A | 5/2016 |
| CN | 106161967 A | 11/2016 |
| CN | 106534708 A | 3/2017 |
| CN | 106851124 A | 6/2017 |
| CN | 106973240 A | 7/2017 |
| CN | 108200354 A | 6/2018 |
| CN | 109544486 A | 3/2019 |
| CN | 110062160 A | 7/2019 |
| CN | 110087003 A | 8/2019 |
| CN | 106534708 B | 2/2020 |
| CN | 110751608 A | 2/2020 |

OTHER PUBLICATIONS

Written Opinion of the International Search Authority in International application No. PCT/CN2020/087209, mailed on Dec. 21, 2020.

Chinese Office Action issued in corresponding Patent Application No. 202010187708.8 dated Jan. 6, 2021, pp. 1-8.

Notification to Grant Patent Right for Invention issued in corresponding Patent Application No. 202010187708.8 dated Jul. 13, 2021, pp. 1-4.

European Search Report in European application No. 20925319.4, mailed on Mar. 11, 2024.

* cited by examiner

IMAGE FUSION METHOD AND APPARATUS, STORAGE MEDIUM AND MOBILE TERMINAL

This application claims the benefits of International Application No. PCT/CN2020/087209, filed Apr. 27, 2020, which claims priority to Chinese Application No. 202010187708.8, filed on Mar. 17, 2020. The entire disclosures of each of the applications are incorporated herein by reference.

TECHNICAL FIELD

The present application relates to internet technologies, and more particularly to an image fusion method and apparatus, a storage medium and a mobile terminal.

DESCRIPTION OF RELATED ARTS

With constant development of terminal technologies, the size of smartphones has become smaller and more complete in functions. For example, the smart phones are equipped with cameras at their bodies for users to take pictures. In the course of development in recent years, pixel resolution of the cameras in the smartphones has been able to fully meet people's daily needs and the smartphones are the most favorite image capturing devices for users.

Nowadays, most of the smartphones are equipped with a High Dynamic Range (HDR) camera mode, which can effectively improve the performance in a large-dynamic-range environment, especially the user experiences in taking pictures against the light. Some smartphones even have realized a HDR auto-start function, namely whether to use the HDR mode can be determined in real time based on the dynamic range of an environment. However, the photos captured in the existing HDR mode are prone to have the subject underexposed or overexposed, resulting in poor effects of the shots.

Technical Problems

Embodiments of the present application provide an image fusion method and apparatus, a storage medium and a mobile terminal, which can prevent the subject of an image captured in a HDR mode from being underexposed or overexposed, and this yields a better effect of a shot.

Technical Solutions

An embodiment of the present application provides an image fusion method, applied to a mobile terminal, the method including:
  obtaining a plurality of continuously-captured preview images when the mobile terminal starts a dynamic image capture mode;
  determining a subject grayscale image and a background grayscale image that correspond to each of the preview images;
  determining a brightness adjustment parameter of a corresponding preview image based on the subject grayscale image and the background grayscale image; and
  fusing the plurality of preview images based on the brightness adjustment parameters.

An embodiment of the present application provides an image fusion apparatus, applied to a mobile terminal, the apparatus including:
  an obtaining module, configured to obtain a plurality of continuously-captured preview images when a mobile terminal starts a dynamic image capture mode;
  a first determination module, configured to determine a subject grayscale image and a background grayscale image that correspond to each of the preview images;
  a second determination module, configured to determine a brightness adjustment parameter of a corresponding preview image based on the subject grayscale image and the background grayscale image; and
  a fusion module, configured to fuse the plurality of preview images based on the brightness adjustment parameters.

The first determination module is specifically used for:
performing a grayscale processing on each of the preview images to obtain a grayscale image correspondingly; and
performing image segmentation on the grayscale image to obtain the subject grayscale image and the background grayscale image that correspond to the grayscale image.

The second determination module specifically includes:
a first determination unit, configured to determine a first bright point set and a first dark point set in the subject grayscale image and a second bright point set and a second dark point set in the background grayscale image;
a second determination unit, configured to determine a bright-point weighting value and a bright-point average difference based on the first bright point set and the second bright point set, and determining a dark-point weighting value and a dark-point average difference based on the first dark point set and the second dark point set; and
a third determination unit, configured to determine the brightness adjustment parameter of the corresponding preview image based on the bright-point weighting value, the dark-point weighting value, the bright-point average difference and the dark-point average difference.

The second determination unit is specifically used for:
determining an average value of grayscale values of all of first bright points in the first bright point set to obtain a subject bright-point average value, and determining an average value of grayscale values of all of second bright points in the second bright point set to obtain a background bright-point average value;
calculating a difference between the subject bright-point average value and the background bright-point average value to obtain the bright-point average difference;
determining an image center in the subject grayscale image; and
determine the bright-point weighting value based on the first bright point set, the second bright point set, the image center and the bright-point average difference.

The second determination unit is specifically used for:
determining a first distance value between each of the first bright points in the first bright point set and the image center point, and determining a second distance between each of the second bright points in the second bright point set and the image center;
determining a weight corresponding to the first bright point based on the first distance value, and determining a weight corresponding to the second bright point based on the second distance value;
calculating a product of the weight of each of the first bright points and the bright-point average difference, and calculating a product of the weight of each of the second bright points and the bright-point average difference; and calculating an average value of a sum of all the products to obtain the bright-point weighting value.

The brightness adjustment parameter includes a first brightness adjustment parameter and a second brightness adjustment parameter, and the second determination unit is specifically used for:

calculating a difference between the bright-point weighting value and the bright-point average difference to obtain a first difference value, and determining the first brightness adjustment parameter of the first bright point set and the second bright point set based on the first difference value; and calculating a difference between the dark-point weighting value and the dark-point average difference to obtain a second difference value, and determining the second brightness adjustment parameter of the first dark point set and the second dark point set based on the second difference value.

The fusion module is specifically used for:

using the first brightness adjustment parameter to perform brightness adjustment on the first bright point set and the second bright point set and using the second brightness adjustment parameter to perform brightness adjustment on the first dark point set and the second dark point set to adjust the preview image; and fusing the plurality of preview images that are adjusted into a single image to obtain a fused image.

An embodiment of the present application provides a computer readable storage medium, storing a plurality of instructions applicable to be loaded by a processor to execute any of the afore-mentioned image fusion methods.

An embodiment of the present invention provides a mobile terminal, including a processor and a storage that are electrically connected to each other, the storage configured to store instructions and data, the processor configured to execute any of the afore-mentioned image fusion methods.

Beneficial Effects

In the image fusion method and apparatus, the storage medium and the mobile terminal provided in the present application, which are applied to a mobile terminal. In this application, a plurality of continuously-captured preview images is obtained when the mobile terminal starts a dynamic image capture mode; a subject grayscale image and a background grayscale image that correspond to each of the preview images are determined; after that, a brightness adjustment parameter of a corresponding preview image is determined based on the subject grayscale image and the background grayscale image; and the plurality of preview images are fused based on the brightness adjustment parameters. Therefore, it can prevent the subject of an image captured in a HDR mode from being underexposed or overexposed. This yields a better effect of a shot, further reduces the number of user retakes and saves a waste of terminal resources.

BRIEF DESCRIPTION OF THE DRAWINGS

The technical solutions and other beneficial effects of the present application will be more apparent with reference to the detailed descriptions of the embodiments of the present application below in accompanying with the drawings.

DETAILED DESCRIPTION

The technical solutions in the embodiments of the present application are clearly and completely described below with reference to appending drawings of the embodiments of the present application. Obviously, the described embodiments are merely a part of embodiments of the present application and are not all of the embodiments. Based on the embodiments of the present application, all the other embodiments obtained by those of ordinary skill in the art without making any inventive effort are within the scope the present application.

Embodiments of the present application provide an image fusion method and apparatus, a storage medium and a mobile terminal.

Figure 1:
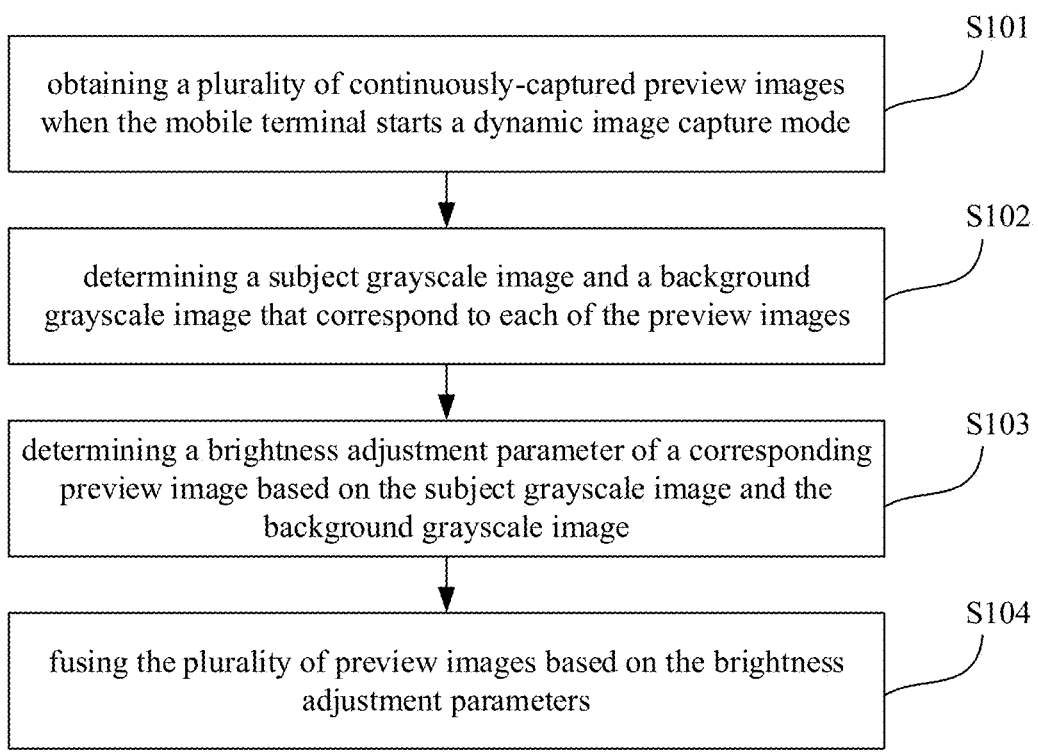
FIG. 1 is a schematic flowchart of an image fusion method provided in an embodiment of the present application.

As shown in FIG. 1, FIG. 1 is a schematic flowchart of an image fusion method provided in an embodiment of the present application. The image fusion method is applied to a mobile terminal. The mobile terminal can be a device with a High Dynamic Range (HDR) image capture mode, such as a smartphone, an iPad, a smart camera and etc. The detailed processes can be as follows:

(S101) obtaining a plurality of continuously-captured preview images when a mobile terminal starts a dynamic image capture mode.

The dynamic image capture mode is a HDR image capture mode. In this mode, based on Low-Dynamic Range (LDR) images with different exposure times, the LDR images with rich details during the exposure times are synthesized to form a final HDR image, thereby better reflecting a real environment with a vivid visual effect.

(S102) determining a subject grayscale image and a background grayscale image that correspond to each of the preview images.

For example, the foregoing step S102 may specifically include:

performing a grayscale processing on each of the preview images to obtain a grayscale image correspondingly; and perform image segmentation on the grayscale image to obtain the subject grayscale image and the background grayscale image that correspond to the grayscale image.

The grayscale processing is to transform a color image into a grayscale image. Each pixel in the grayscale image is represented by a grayscale value. In a RGB model, if R=G=B, then the color is represented by a gray color, wherein the value of R=G=B is called the grayscale value and the grayscale value ranges from 0 to 255. RGB values with 0% grayscale are 255, 255 and 255, respectively.

The image segmentation is to divide the background and the subject in an image. A part of the grayscale image where the subject is located is the subject grayscale image, and a part of the grayscale image where the background is located is the background grayscale image.

(S103) determining a brightness adjustment parameter of a corresponding preview image based on the subject grayscale image and the background grayscale image.

Figure 2:
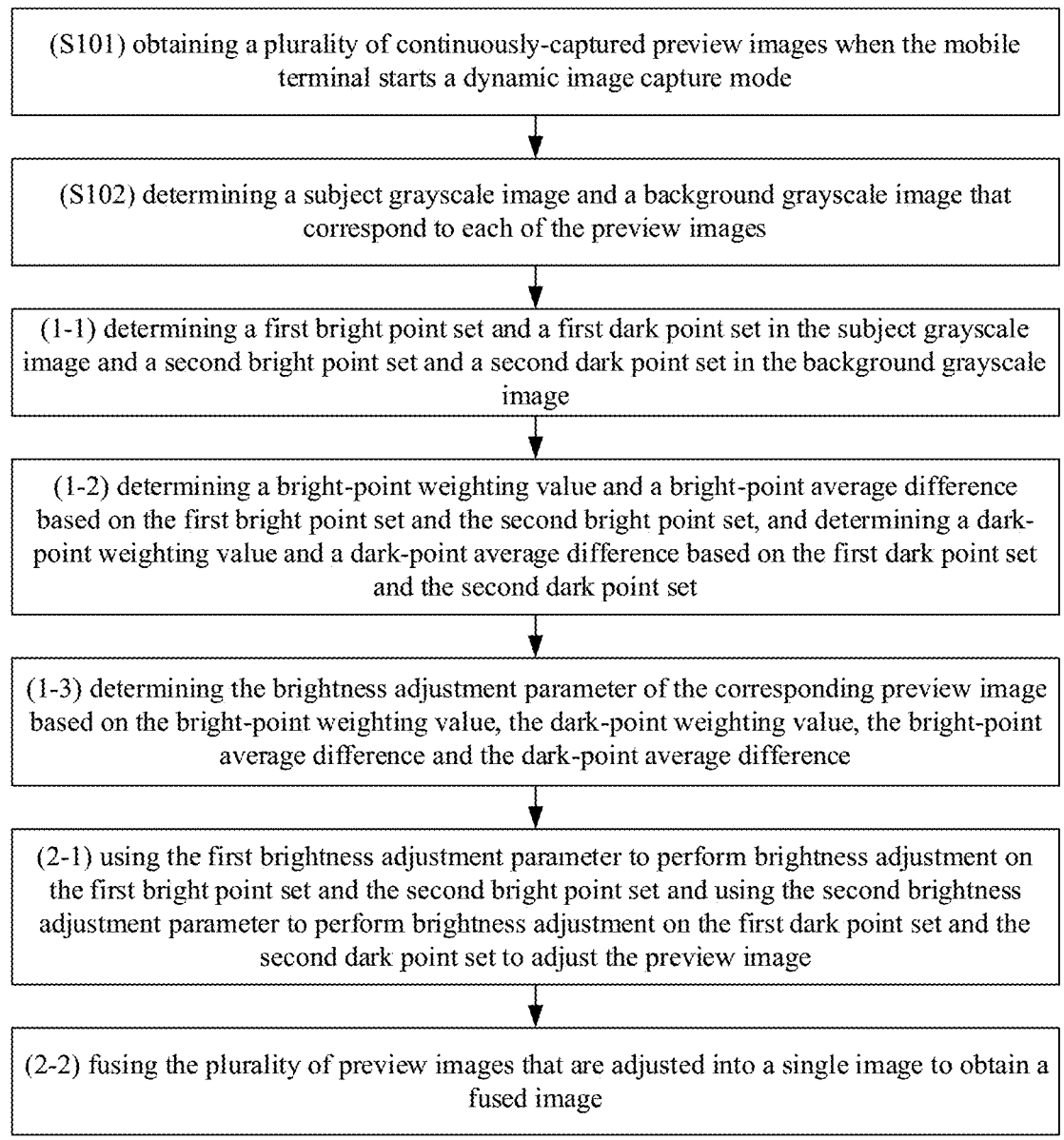
FIG. 2 is another schematic flowchart of an image fusion method provided in an embodiment of the present application.

For example, referring to FIG. 2, the foregoing step S103 may specifically include:

(1-1) determining a first bright point set and a first dark point set in the subject grayscale image and a second bright point set and a second dark point set in the background grayscale image.

Pixels with grayscale values lower than a brightness threshold can be regarded as dark points, and pixels with grayscale values not lower than the brightness threshold can be regarded as bright points. Then, all the bright points in the subject grayscale image form the first bright point set, and all the dark points in the subject grayscale image form the first dark point set; all the bright points in the background grayscale image form the second bright point set, and all the dark points in the background grayscale image form the second dark point set.

(1-2) determining a bright-point weighting value and a bright-point average difference based on the first bright point set and the second bright point set, and determining a dark-point weighting value and a dark-point average difference based on the first dark point set and the second dark point set.

The bright-point weighting value and the dark-point weighting value can be calculated in a same way, and the bright-point average difference and the dark-point average difference can be calculated by a same formula. The bright-point weighting value and the bright-point average difference are obtained by processing the bright points, and the dark-point weighting value and the dark-point average difference are obtained by processing the dark points.

For example, "determining the bright-point weighting value and the bright-point average difference based on the first bright point set and the second bright point set" in the foregoing step may specifically include:

determining an average value of grayscale values of all of first bright points in the first bright point set to obtain a subject bright-point average value, and determining an average value of grayscale values of all of second bright points in the second bright point set to obtain a background bright-point average value;

calculating a difference between the subject bright-point average value and the background bright-point average value to obtain the bright-point average difference;

determining an image center in the subject grayscale image; and determine the bright-point weighting value based on the first bright point set, the second bright point set, the image center and the bright-point average difference.

The subject bright-point average value reflects the brightness of the subject image, the background bright-point average value reflects the brightness of the background image, and the difference (i.e., the bright-point average difference) between the subject bright-point average value and the background bright-point average value reflects brightness contrast between the subject and the background.

The image center can be a geometric center of the subject grayscale image. Of course, it can also be a point selected based on an important part of the subject. The important part of the subject may depend on the type of the subject. For example, for a human being, the face is an important part, and the image center can be a center of the face. For a building, the entire object can be considered as an important part, and the image center can be a geometric center of that.

For example, "determine the bright-point weighting value based on the first bright point set, the second bright point set, the image center and the bright-point average difference" in the foregoing step may include:

determining a first distance value between each of the first bright points in the first bright point set and the image center point, and determining a second distance between each of the second bright points in the second bright point set and the image center;

determining a weight corresponding to the first bright point based on the first distance value, and determining a weight corresponding to the second bright point based on the second distance value;

calculating a product of the weight of each of the first bright points and the bright-point average difference, and calculating a product of the weight of each of the second bright points and the bright-point average difference; and calculating an average value of a sum of all the products to obtain the bright-point weighting value.

It can set weights for different distance values in advance, and then it only needs to obtain the weight that corresponds to the distance value actually calculated. It can also set a plurality of ranges of distance values and set a weight for each range of distance values in advance, and then it only needs to determine which range of distance values the actually calculated distance value belongs to and obtain the weight that corresponds to this range of distance values. Generally, considering that it should put an emphasis on the subject for the captured image, the bright points or the dark points located far away from the center of the subject should have a small weight. Conversely, a large weight should be set. The bright-point weighting value is directed to a kind of brightness difference obtained in consideration of the distances between the bright points in the whole preview image (including the subject and the background) and the image center. Therefore, an image obtained by being adjusted based on the bright-point weighting value can greatly prevent the subject from being overexposed or underexposed and focus more on the subject.

For example, it is assumed that the first bright point set is represented by $\{a1, a2, \ldots, an\}$ and the image center is O. Then, the distance value between each first bright point and the image center can be determined based on the coordinate of each first bright point in $\{a1, a2, \ldots, an\}$ on the image and the coordinate of point O on the image. For example, the distance between point a1 and point O is indicated by La10. The larger La10 is, the smaller the weight should be assigned.

(1-3) determining the brightness adjustment parameter of the corresponding preview image based on the bright-point weighting value, the dark-point weighting value, the bright-point average difference and the dark-point average difference.

For example, the brightness adjustment parameter includes a first brightness adjustment parameter and a second brightness adjustment parameter, and the foregoing step 1-3 may specifically include:

calculating a difference between the bright-point weighting value and the bright-point average difference to obtain a first difference value, and determining the first brightness adjustment parameter of the first bright point set and the second bright point set based on the first difference value; and calculating a difference between the dark-point weighting value and the dark-point average difference to obtain a second difference value, and determining the second brightness adjustment parameter of the first dark point set and the second dark point set based on the second difference value.

It can set different ranges of the differences for the dark points (bright points) and set a value of the second brightness adjustment parameter (first brightness adjustment parameter) for each range of the differences in advance, and then it only needs to determine which range of the differences the actual difference belongs to and obtain a value of the second brightness adjustment parameter (first brightness adjustment parameter) that corresponds to this range of the differences.

Specifically, the first difference and the second difference can be 0, a positive number or a negative number. When the first difference or the second difference is 0, an appropriate exposure can be assumed. When the first difference or the second difference is a positive number, an underexposure can be assumed. When the first difference and the second difference are negative numbers, an overexposure can be assumed.

Figure 3:
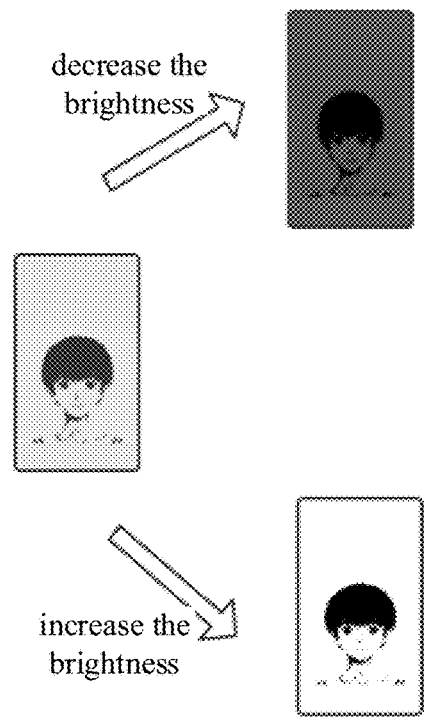
FIG. 3 is a schematic diagram illustrating a case of image brightness adjustment provided in an embodiment of the present application.

For example, in FIG. 3, it is assumed that a certain preview image is a selfie of user B, the subject is a human face, and the background is an image area except the human face. When the selfie is determined to have an appropriate exposure, no brightness adjustment is made. When the selfie is determined to have an underexposure, it needs to increase the brightness of the image. When the selfie is determined to have an overexposure, it needs to decrease the brightness of the image.

(S104) fusing the plurality of preview images based on the brightness adjustment parameters.

For example, in FIG. 2, the foregoing step S104 may specifically include:

(2-1) using the first brightness adjustment parameter to perform brightness adjustment on the first bright point set and the second bright point set and using the second brightness adjustment parameter to perform brightness adjustment on the first dark point set and the second dark point set to adjust the preview image; and (2-2) fusing the plurality of preview images that are adjusted into a single image to obtain a fused image.

For a single preview image, brightness adjustment is performed on the bright points and the dark points of the preview image by using the first brightness adjustment parameter and the second brightness adjustment parameter, respectively. In this way, it is ensured that the brightness of each of the preview images falls within an appropriate range. After that, the plurality of preview images are fused such that a fused image has rich details and better effects as compared to each original preview image.

It can be seen from above description that the image fusion method provided in the present application is applied to a mobile terminal. In this method, a plurality of continuously-captured preview images is obtained when the mobile terminal starts a dynamic image capture mode; a subject grayscale image and a background grayscale image that correspond to each of the preview images are determined; after that, a brightness adjustment parameter of a corresponding preview image is determined based on the subject grayscale image and the background grayscale image; and the plurality of preview images are fused based on the brightness adjustment parameters. Therefore, it can prevent the subject of an image captured in a HDR mode from being underexposed or overexposed. This yields a better effect of a shot, further reduces the number of user retakes and saves a waste of terminal resources.

Based on the method described in the foregoing embodiment, this embodiment will be further described from the perspective of an image fusion apparatus. The image fusion apparatus can be implemented as an independent entity or integrated in a mobile terminal. The mobile terminal can be a device with a High Dynamic Range (HDR) image capture mode, such as a smartphone, an iPad, a smart camera and etc.

Figure 4:
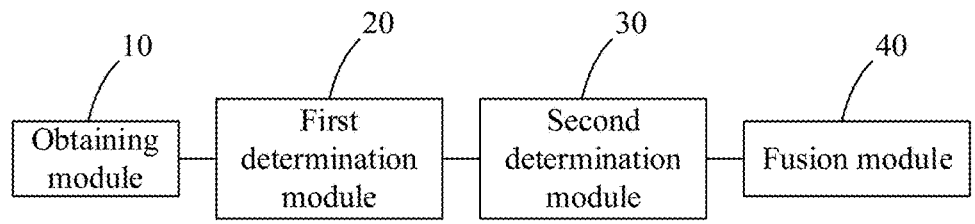
FIG. 4 is a structural schematic diagram showing an image fusion apparatus provided in an embodiment of the present application.

Referring to FIG. 4, this figure illustrates an image fusion apparatus provided in an embodiment of the present application. The image fusion apparatus may include an obtaining module 10, a first determination module 20, a second determination module 30 and a fusion module 40.

(1) Obtaining Module 10

The obtaining module 10 is configured to obtain a plurality of continuously-captured preview images when a mobile terminal starts a dynamic image capture mode.

The dynamic image capture mode is a HDR image capture mode. In this mode, based on Low-Dynamic Range (LDR) images with different exposure times, the LDR images with rich details during the exposure times are synthesized to form a final HDR image, thereby better reflecting a real environment with a vivid visual effect.

(2) First Determination Module 20

The first determination module 20 is configured to determine a subject grayscale image and a background grayscale image that correspond to each of the preview images.

The first determination module 20 is specifically configured to:

perform a grayscale processing on each of the preview images to obtain a grayscale image correspondingly; and perform image segmentation on the grayscale image to obtain the subject grayscale image and the background grayscale image that correspond to the grayscale image.

The grayscale processing is to transform a color image into a grayscale image. Each pixel in the grayscale image is represented by a grayscale value. In a RGB model, if R=G=B, then the color is represented by a gray color, wherein the value of R=G=B is called the grayscale value and the grayscale value ranges from 0 to 255. RGB values with 0% grayscale are 255, 255 and 255, respectively.

The image segmentation is to divide the background and the subject in an image. A part of the grayscale image where the subject is located is the subject grayscale image, and a part of the grayscale image where the background is located is the background grayscale image.

(3) Second Determination Module 30

The second determination module 30 is configured to determine a brightness adjustment parameter of a corresponding preview image based on the subject grayscale image and the background grayscale image.

Figure 5:
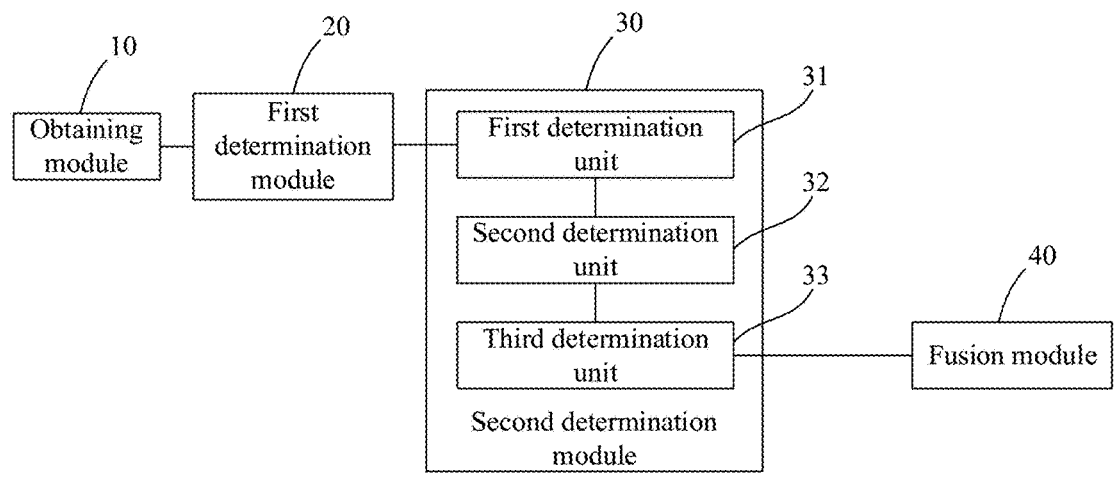
FIG. 5 is another structural schematic diagram showing an image fusion apparatus provided in an embodiment of the present application.

For example, referring to FIG. 5, the second determination module 30 specifically includes:

a first determination unit 31, configured to determine a first bright point set and a first dark point set in the subject grayscale image and a second bright point set and a second dark point set in the background grayscale image.

Pixels with grayscale values lower than a brightness threshold can be regarded as dark points, and pixels with grayscale values not lower than the brightness threshold can be regarded as bright points. Then, all the bright points in the subject grayscale image form the first bright point set, and all the dark points in the subject grayscale image form the first dark point set; all the bright points in the background grayscale image form the second bright point set, and all the dark points in the background grayscale image form the second dark point set.

a second determination unit 32, configured to determine a bright-point weighting value and a bright-point average difference based on the first bright point set and the second bright point set, and determining a dark-point weighting value and a dark-point average difference based on the first dark point set and the second dark point set.

The bright-point weighting value and the dark-point weighting value can be calculated in a same way, and the bright-point average difference and the dark-point average difference can be calculated by a same formula. The bright-point weighting value and the bright-point average difference are obtained by processing the bright points, and the dark-point weighting value and the dark-point average difference are obtained by processing the dark points.

For example, the second determination unit 32 is specifically used for:

(1-1) determining a first bright point set and a first dark point set in the subject grayscale image and a second bright point set and a second dark point set in the background grayscale image.

Pixels with grayscale values lower than a brightness threshold can be regarded as dark points, and pixels with grayscale values not lower than the brightness threshold can be regarded as bright points. Then, all the bright points in the subject grayscale image form the first bright point set, and all the dark points in the subject grayscale image form the first dark point set; all the bright points in the background grayscale image form the second bright point set, and all the dark points in the background grayscale image form the second dark point set.

(1-2) determining a bright-point weighting value and a bright-point average difference based on the first bright point set and the second bright point set, and determining a dark-point weighting value and a dark-point average difference based on the first dark point set and the second dark point set.

The bright-point weighting value and the dark-point weighting value can be calculated in a same way, and the bright-point average difference and the dark-point average difference can be calculated by a same formula. The bright-point weighting value and the bright-point average difference are obtained by processing the bright points, and the dark-point weighting value and the dark-point average difference are obtained by processing the dark points.

When executing "determining the bright-point weighting value and the bright-point average difference based on the first bright point set and the second bright point set" in the foregoing step, the second determination unit 22 is specifically used for:

determining an average value of grayscale values of all of first bright points in the first bright point set to obtain a subject bright-point average value, and determining an average value of grayscale values of all of second bright points in the second bright point set to obtain a background bright-point average value;

calculating a difference between the subject bright-point average value and the background bright-point average value to obtain the bright-point average difference;

determining an image center in the subject grayscale image; and determine the bright-point weighting value based on the first bright point set, the second bright point set, the image center and the bright-point average difference.

The subject bright-point average value reflects the brightness of the subject image, the background bright-point average value reflects the brightness of the background image, and the difference (i.e., the bright-point average difference) between the subject bright-point average value and the background bright-point average value reflects brightness contrast between the subject and the background. The image center can be a geometric center of the subject grayscale image. Of course, it can also be a point selected based on an important part of the subject. The important part of the subject may depend on the type of the subject. For example, for a human being, the face is an important part, and the image center can be a center of the face. For a building, the entire object can be considered as an important part, and the image center can be a geometric center of that.

For example, when executing "determine the bright-point weighting value based on the first bright point set, the second bright point set, the image center and the bright-point average difference" in the foregoing step, the second determination unit 22 is specifically used for:

determining a first distance value between each of the first bright points in the first bright point set and the image center point, and determining a second distance between each of the second bright points in the second bright point set and the image center;

determining a weight corresponding to the first bright point based on the first distance value, and determining a weight corresponding to the second bright point based on the second distance value;

calculating a product of the weight of each of the first bright points and the bright-point average difference, and calculating a product of the weight of each of the second bright points and the bright-point average difference; and calculating an average value of a sum of all the products to obtain the bright-point weighting value.

It can set weights for different distance values in advance, and then it only needs to obtain the weight that corresponds to the distance value actually calculated. It can also set a plurality of ranges of distance values and set a weight for each range of distance values in advance, and then it only needs to determine which range of distance values the actually calculated distance value belongs to and obtain the weight that corresponds to this range of distance values. Generally, considering that it should put an emphasis on the subject for the captured image, the bright points or the dark points located far away from the center of the subject should have a small weight. Conversely, a large weight should be set. The bright-point weighting value is directed to a kind of brightness difference obtained in consideration of the distances between the bright points in the whole preview image (including the subject and the background) and the image center. Therefore, an image obtained by being adjusted based on the bright-point weighting value can greatly prevent the subject from being overexposed or underexposed and focus more on the subject.

For example, it is assumed that the first bright point set is represented by {a1, a2, ..., an} and the image center is O. Then, the distance value between each first bright point and the image center can be determined based on the coordinate of each first bright point in {a1, a2, ..., an} on the image and the coordinate of point O on the image. For example, the distance between point a1 and point O is indicated by La10. The larger La10 is, the smaller the weight should be assigned.

a third determination unit 33, configured to determine the brightness adjustment parameter of the corresponding preview image based on the bright-point weighting value, the dark-point weighting value, the bright-point average difference and the dark-point average difference.

For example, the brightness adjustment parameter includes a first brightness adjustment parameter and a second brightness adjustment parameter, and the second determination unit 33 is specifically used for:

calculating a difference between the bright-point weighting value and the bright-point average difference to obtain a first difference value, and determining the first brightness adjustment parameter of the first bright point set and the second bright point set based on the first difference value; and calculating a difference between the dark-point weighting value and the dark-point average difference to obtain a second difference value, and determining the second brightness adjustment parameter of the first dark point set and the second dark point set based on the second difference value.

Specifically, the first difference and the second difference can be 0, a positive number or a negative number. When the first difference or the second difference is 0, an appropriate exposure can be assumed. When the first difference or the second difference is a positive number, an underexposure can be assumed. When the first difference and the second difference are negative numbers, an overexposure can be assumed.

For example, in FIG. 3, it is assumed that a certain preview image is a selfie of user B, the subject is a human face, and the background is an image area except the human face. When the selfie is determined to have an appropriate exposure, no brightness adjustment is made. When the selfie is determined to have an underexposure, it needs to increase the brightness of the image. When the selfie is determined to have an overexposure, it needs to decrease the brightness of the image.

(4) Fusion Module 40

The fusion module 40 is configured to fuse the plurality of preview images based on the brightness adjustment parameters.

The fusion module 40 is specifically used for:

(2-1) using the first brightness adjustment parameter to perform brightness adjustment on the first bright point set and the second bright point set and using the second brightness adjustment parameter to perform brightness adjustment on the first dark point set and the second dark point set to adjust the preview image; and (2-2) fusing the plurality of preview images that are adjusted into a single image to obtain a fused image.

For a single preview image, brightness adjustment is performed on the bright points and the dark points of the preview image by using the first brightness adjustment parameter and the second brightness adjustment parameter, respectively. In this way, it is ensured that the brightness of each of the preview images falls within an appropriate range. After that, the plurality of preview images are fused such that a fused image has rich details and better effects as compared to each original preview image.

During specific implementation, the foregoing units may be implemented as independent entities, or may be implemented as one or more entities through random combination. For specific implementation of the foregoing units, refer to the above method embodiment, and details are not described herein again.

It can be seen from above description that the image fusion apparatus provided in the present application is applied to a mobile terminal. With a use of this apparatus, the obtaining module 10 obtains a plurality of continuously-captured preview images when the mobile terminal starts a dynamic image capture mode; the first determination module 20 determines a subject grayscale image and a background grayscale image that correspond to each of the preview images; after that, the second determination module 30 determines a brightness adjustment parameter of a corresponding preview image based on the subject grayscale image and the background grayscale image; and the fusion module 40 fuses the plurality of preview images based on the brightness adjustment parameters. Therefore, it can prevent the subject of an image captured in a HDR mode from being underexposed or overexposed. This yields a better effect of a shot, further reduces the number of user retakes and saves a waste of terminal resources.

Correspondingly, an embodiment of the present invention also provides an image fusion system, which includes any one of the image fusion apparatuses provided in the embodiments of the present invention, and the image fusion apparatus may be integrated in a mobile terminal.

The mobile terminal can be used for obtaining a plurality of continuously-captured preview images when a dynamic image capture mode is activated;

determining a subject grayscale image and a background grayscale image that correspond to each of the preview images;

determining a brightness adjustment parameter of a corresponding preview image based on the subject grayscale image and the background grayscale image; and fusing the plurality of preview images based on the brightness adjustment parameters.

Implementation of each of the foregoing devices may refer to above embodiments, and is not repeated herein.

Since the image fusion system may include any one of the image fusion apparatuses provided in the embodiments of the present invention, it can realize the beneficial effects achieved by any one of the image fusion apparatuses provided in the embodiments of the present invention, which are referred to above embodiments and are not repeated herein.

Figure 6:
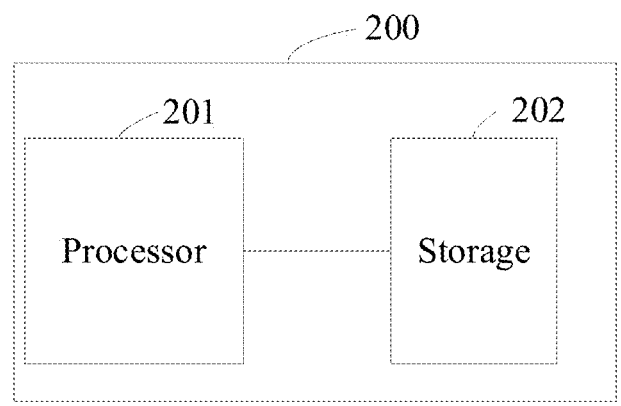
FIG. 6 is a structural schematic diagram showing a mobile terminal provided in an embodiment of the present invention.

In addition, an embodiment of the present application also provides a terminal device. The terminal device may be a device such as a smartphone or an intelligent vehicle. As shown in FIG. 6, the mobile terminal 200 includes a processor 201 and a storage 202. The processor 201 and the storage 202 are electrically connected to each other.

The processor 201 functions as a control center of the terminal device 200 and is configured to connect each component of the terminal device using various interfaces and circuits, and is configured to execute or load application programs stored in the storage 202, to call the data stored in the storage 202 and to execute various functions of the terminal device and perform data processing, thereby monitoring the overall terminal device.

In the present embodiment, the processor 201 of the terminal device 200 will load the instructions corresponding to a process of one or more than one application programs into the storage 202 based on the following steps, and the processor 201 will execute the application program stored in the storage 202 to realize various functions:

obtaining a plurality of continuously-captured preview images when a mobile terminal starts a dynamic image capture mode;

determining a subject grayscale image and a background grayscale image that correspond to each of the preview images;

determining a brightness adjustment parameter of a corresponding preview image based on the subject grayscale image and the background grayscale image; and fusing the plurality of preview images based on the brightness adjustment parameters.

Figure 7:
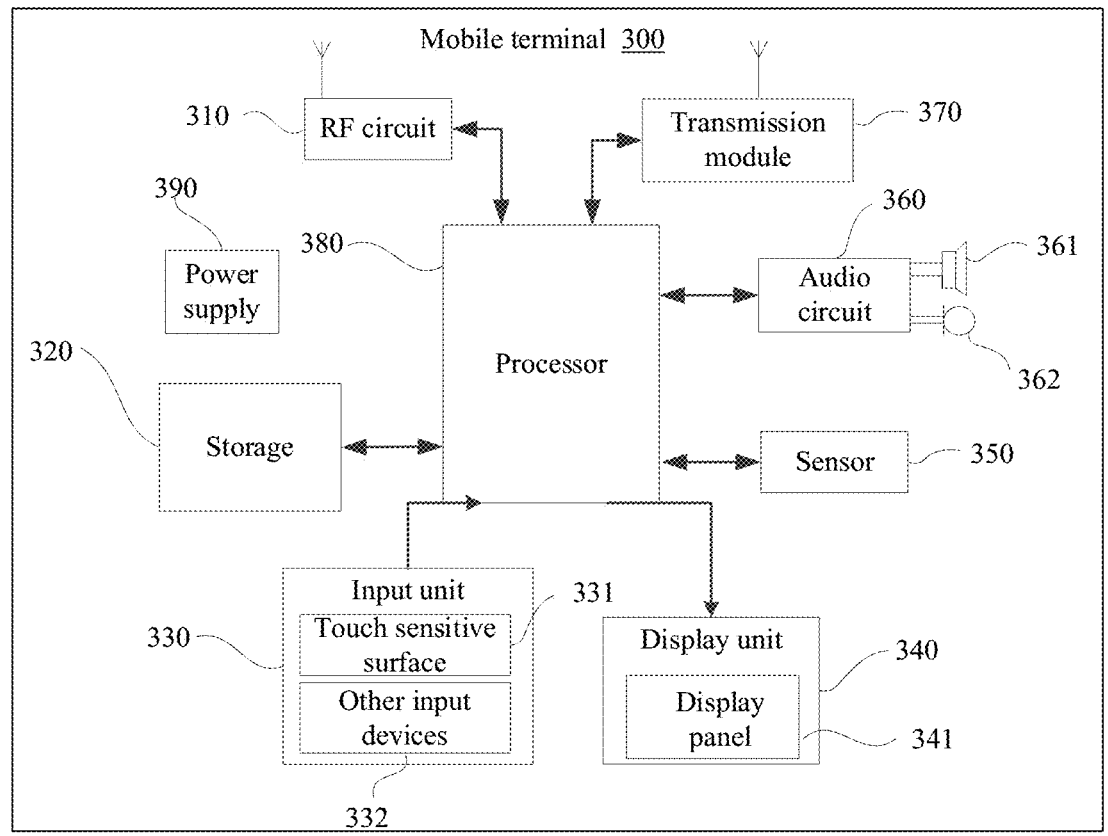
FIG. 7 is another structural schematic diagram showing a mobile terminal provided in an embodiment of the present invention.

FIG. 7 is a structural block diagram showing a terminal device provided in an embodiment of the present invention. The terminal device can be utilized to implement the image fusion method provided in above embodiments. The terminal device 300 can be a smartphone or a tablet computer.

The RF circuit 310 is configured to receive and transmit electromagnetic waves to implement conversion between the electromagnetic waves and electrical signals, thereby communicating with a communication network or any other device. The RF circuit 310 may include various existing circuit components for executing the functions, for example, an antenna, an RF transceiver, a digital signal processor, an encryption/decryption chip, a subscriber identity module (SIM) card, a storage, and so on. The RF circuit 310 can communicate with various networks, such as internet, an intranet, or a wireless network, or can communicate with other devices via the wireless network. The above-mentioned wireless network may include a cellular network or a wireless local area network or metropolitan area network. The above-mentioned wireless network may use any one of communication standards, protocols, or technologies, including but not limited to Global System for Mobile communications (GSM), Enhanced Data GSM Environment (EDGE), Wideband Code Division Multiple Access (WCDMA), Code Division Multiple Access (CDMA), Time Division Multiple Access (TDMA), WIFI (such as standards of the Institute of Electrical and Electronics Engineers including IEEE802.11a, IEEE802.11b, IEEE 802.11g, and/or IEEE 802.11n), Voice over Internet Protocol (VOIP), Worldwide Interoperability for Microwave Access (Wi-Max), any other protocol for mails, instant communication, and short messages, any other suitable communication protocol, or any other protocol which has not been developed.

The storage 320 can be configured to store software programs and modules, such as the program instructions/modules corresponding to the front-camera-captured automatic light compensation method and system in above-mentioned embodiments. The processor 380 can perform various applications of functions and data processing by executing the software programs and modules stored in the storage 320 to implement the function of front-camera-captured automatic light compensation. The storage 320 may include high-speed random access memory, and may further include non-volatile memory such as one or more disk storage devices, a flash memory, or other non-volatile solid state storage. In some embodiments, the storage 320 also includes a remote storage disposed corresponding to the processor 380. The remote storage may be linked to the terminal device 300 via a network. The network may include but not limited to at least one combination of internet, an intranet, a local area network, and a mobile communication network.

The input unit 330 can be configured to receive input numbers or character information, and generate signal input of a keyboard, a mouse, a joystick, or an optical trackball in relation to user settings and functional control. Specifically, the input unit 330 may include a touch sensitive surface 331 and any other input device 332. The touch sensitive surface 331, which is also called a touch screen or a touchpad, can gather a touch operation (for example, operations by use of a finger of a user, a stylus, and any other suitable object or attachment on or near the sensitive surface 331) applied on or near to the touch sensitive surface 331 by the user and drive a connected device according to preset programs. Optionally, the touch sensitive surface 331 may include a touch-sensitive device and a touch controller. The touch-sensitive device detects a direction of the user's touch, detects signals resulted from the touch operation, and transmits the signals to the touch controller. The touch controller receives information of the touch from the touch-sensitive device, converts it into a touch coordinate, further transmits the coordinate to the processor 380, and further receives and executes an instruction from the processor 380. Furthermore, the touch sensitive surface 331 may be implemented by utilizing capacitive, resistive, infrared, and surface acoustic wave technologies. In addition to the touch sensitive surface 331, the input unit 330 may further include any other input device 332. Specifically, the input device 332 may include but not limited to one or any of the combination of a physical keyboard, function keys (such as volume control keys, switch keys, etc.), a trackball, a mouse, and a joystick.

The display unit 340 may be configured to display information inputted by the user, information provided for the user, or various types of graphical user interfaces of the terminal device 300. The graphical user interfaces may include a graph, a text, an icon, a video, and any combination of them. The display unit 340 may include a display panel 341, optionally, which may be a liquid crystal display (LCD) or an Organic Light-Emitting Diode (OLED) display. Furthermore, the touch sensitive surface 331 may cover the display panel 341. When the touch sensitive surface 331 detects a touch operation on or near the touch sensitive surface 331 and transmits a corresponding signal to the processor 380 to determine a type of the touch event, the processor 380 controls the display panel 341 to provide appropriate visual output according to the type of the touch event. Although the touch sensitive surface 331 and the display panel 341 in FIG. 7 are two separate components for implementing input and output functions, the touch sensitive surface 331 and the display panel 341 may be integrated into one component for implementing the input and output functions in some embodiments.

The terminal device 300 may further include at least one sensor 350, such as a light sensor, a motion sensor, and other sensors. Specifically, the light sensor can include an ambient light sensor and a proximity sensor. The ambient light sensor can adjust the brightness of the display panel 341 according to bright or dark as to the ambient light. The proximity sensor can turn off the display panel 341 and/or the backlight when the terminal device 300 is moved close to ears. As one type of the motion sensor, a gravity sensor (G-sensor) can detect acceleration speed on all directions (generally up to three axis), can detect magnitude and direction of the gravity when it stays still, and can identify a gesture in a cell phone application (such as a screen switch between landscape style and portrait style, relevant games, and magnetometer calibration) and recognize vibration patterns to identify relevant functions (such as pedometer, and knock), and so on. Additionally, a gyroscope, a barometer, a hygrometer, a thermometer, an infrared sensor, and any other sensor can be deployed in the terminal device 300, and the details for these are not repeated herein.

The audio circuit 360, a speaker 361, and a microphone 362 provide an audio interface between the user and the terminal device 300. The audio circuit 360 converts received audio data to an electrical signal and transmits the electrical signal to the speaker 361. The speaker 361 converts the electrical signal to sound signals and outputs the sound signals. In addition, the microphone 362 converts collected sound signal to an electrical signal. The audio circuit 360 converts the electrical signal to audio data and transmits the audio data to the processor 380 for further processing. After the processing, the audio data may be transmitted to another terminal via the RF circuit 310, or transmitted to the storage 320 for further processing. The audio circuit 360 may further include an earphone jack for providing communication between an external earphone and the terminal device 300.

The terminal device 300 can be configured to, by the transmission module 370 (such as a WIFI module), send and receive emails, browse a webpage, and access to streaming media, and so on. It provides the user with wireless broadband internet access. It should be understood that although the transmission module 370 is illustrated in FIG. 7, this module is not an essential component for the terminal device 300 and can be omitted according to needs without departing from the scope of the present invention.

The processor 380 functions as a control center of the terminal device 300 and is configured to connect each component of the cell phone using various interfaces and circuits, and is configured to execute the various functions of the terminal device 300 and to perform data processing by running or executing the software programs and/or modules stored in the storage 320 and calling the data stored in the storage 320, thereby monitoring the overall cell phone. Optionally, the processor 380 can include one or more processing cores. In some embodiments, an application processor and a modulation/demodulation processor can be integrated to form the processor 380. The application processor is primarily configured to process an operating system, user interfaces, application programs, and so on. The modulation/demodulation processor is primarily configured to process wireless communication. It should be understood that the modulation/demodulation processor can be independent from the processor 380.

The terminal device 300 further includes the power supply 390 (such as a battery) configured to provide power for the various components of the terminal device 300. In some embodiments, the power supply can be logically coupled to the processor 380 via a power management system that controls charging, discharging, power consumption, and so on. The power supply 190 may further include one or more direct current (DC)/or alternating current (AC) power sources, recharging system, power failure detection circuit, power converter or inverter, power supply status indicator, and the like.

Although not being shown, the terminal device 300 may include a camera (such as a front camera and a rear camera), a BLUETOOTH module, and so on. They are not repeated herein. In the present embodiment, a display unit of the mobile terminal is a display with a touch screen. The terminal device further includes a storage and one or more programs. The one or more programs are stored in the storage. After configuration, one or more processors execute the one or more programs, which include the following operating instructions:

obtaining a plurality of continuously-captured preview images when a mobile terminal starts a dynamic image capture mode;

determining a subject grayscale image and a background grayscale image that correspond to each of the preview images;

determining a brightness adjustment parameter of a corresponding preview image based on the subject grayscale image and the background grayscale image; and fusing the plurality of preview images based on the brightness adjustment parameters.

During specific implementation, the foregoing modules may be implemented as independent entities, or may be implemented as one or more entities through random combination. For specific implementation of the foregoing modules, refer to the above method embodiments, and details are not described herein again.

A person of ordinary skill in the art may understand that all or some of the steps in various methods of the foregoing embodiments may be implemented by program instructions, or may be implemented by a program instructing relevant hardware. The program instructions may be stored in a computer readable storage medium, and be loaded and executed by a processor. For this, an embodiment of the present invention provides a storage medium, which stores a plurality of instructions that can be loaded by the processor to execute the steps of any of the image fusion methods provided in the embodiments of the present invention.

The storage medium may include a read only memory (ROM), a random access memory (RAM), a magnetic disk or an optic disc.

Since the program instructions stored in the storage medium can execute the steps of any of the image fusion methods provided in the embodiments of the present invention, it can realize the beneficial effects achieved by any of the image fusion methods provided in the embodiments of the present invention, which are referred to above embodiments and are not repeated herein.

Implementation of above operations may refer to above embodiments, and is not repeated herein.

While the preferred embodiments of the present application have been illustrated and described in detail, various modifications and alterations can be made by persons skilled in this art. The embodiment of the present application is therefore described in an illustrative but not restrictive sense. It is intended that the present application should not be limited to the particular forms as illustrated, and that all modifications and alterations which maintain the spirit and realm of the present application are within the scope as defined in the appended claims.

What is claimed is:

1. An image fusion method, applied to a mobile terminal, the method comprising:

obtaining a plurality of continuously-captured preview images when the mobile terminal starts a dynamic image capture mode;

determining a subject grayscale image and a background grayscale image that correspond to each of the preview images;

determining a brightness adjustment parameter of a corresponding preview image based on the subject grayscale image and the background grayscale image; and fusing the plurality of preview images based on the brightness adjustment parameters, wherein the determining the brightness adjustment parameter of the corresponding preview image based on the subject grayscale image and the background grayscale image comprises:

determining a first bright point set and a first dark point set in the subject grayscale image and a second bright point set and a second dark point set in the background grayscale image;

determining a bright-point weighting value and a bright-point average difference based on the first bright point set and the second bright point set, and determining a dark-point weighting value and a dark-point average difference based on the first dark point set and the second dark point set; and determining the brightness adjustment parameter of the corresponding preview image based on the bright-point weighting value, the dark-point weighting value, the bright-point average difference and the dark-point average difference;

wherein the determining the bright-point weighting value and the bright-point average difference based on the first bright point set and the second bright point set comprises:

determining an average value of grayscale values of all of first bright points in the first bright point set to obtain a subject bright-point average value, and determining an average value of grayscale values of all of second bright points in the second bright point set to obtain a background bright-point average value;

calculating a difference between the subject bright-point average value and the background bright-point average value to obtain the bright-point average difference;

determining an image center in the subject grayscale image;

determining a first distance value between each of the first bright points in the first bright point set and the image center point, and determining a second distance between each of the second bright points in the second bright point set and the image center;

determining a weight corresponding to the first bright point based on the first distance value, and determining a weight corresponding to the second bright point based on the second distance value;

calculating a product of the weight of each of the first bright points and the bright-point average difference, and calculating a product of the weight of each of the second bright points and the bright-point average difference;

calculating an average value of a sum of all the products to obtain the bright-point weighting value.

2. The image fusion method of claim 1, wherein the determining the subject grayscale image and the background grayscale image that correspond to each of the preview images comprises:

performing a grayscale processing on each of the preview images to obtain a grayscale image correspondingly; and performing image segmentation on the grayscale image to obtain the subject grayscale image and the background grayscale image that correspond to the grayscale image.

3. The image fusion method of claim 1, wherein the determining the first bright point set and the first dark point set in the subject grayscale image comprises:

taking pixels with grayscale values lower than a brightness threshold in the subject grayscale image as first dark points to obtain the first dark point set; and taking pixels with grayscale values not lower than the brightness threshold in the subject grayscale image as first bright points to obtain the first bright point set.

4. The image fusion method of claim 1, wherein the brightness adjustment parameter comprises a first brightness adjustment parameter and a second brightness adjustment parameter, and the determining the brightness adjustment parameter of the corresponding preview image based on the bright-point weighting value, the dark-point weighting value, the bright-point average difference and the dark-point average difference comprises:

calculating a difference between the bright-point weighting value and the bright-point average difference to obtain a first difference value, and determining the first brightness adjustment parameter of the first bright point set and the second bright point set based on the first difference value; and calculating a difference between the dark-point weighting value and the dark-point average difference to obtain a second difference value, and determining the second brightness adjustment parameter of the first dark point set and the second dark point set based on the second difference value.

5. The image fusion method of claim 4, wherein the fusing the plurality of preview images based on the brightness adjustment parameters comprises:

using the first brightness adjustment parameter to perform brightness adjustment on the first bright point set and the second bright point set and using the second brightness adjustment parameter to perform brightness adjustment on the first dark point set and the second dark point set to adjust the preview image; and fusing the plurality of preview images that are adjusted into a single image to obtain a fused image.

6. A non-transitory computer readable storage medium, wherein the storage medium stores a plurality of instructions applicable to be loaded by a processor to execute the following steps:

obtaining a plurality of continuously-captured preview images when a mobile terminal starts a dynamic image capture mode;

determining a subject grayscale image and a background grayscale image that correspond to each of the preview images;

determining a brightness adjustment parameter of a corresponding preview image based on the subject grayscale image and the background grayscale image; and fusing the plurality of preview images based on the brightness adjustment parameters, wherein the instructions are applicable to be loaded by the processor to execute the steps of:

determining a first bright point set and a first dark point set in the subject grayscale image and a second bright point set and a second dark point set in the background grayscale image;

determining a bright-point weighting value and a bright-point average difference based on the first bright point set and the second bright point set, and determining a dark-point weighting value and a dark-point average difference based on the first dark point set and the second dark point set; and determining the brightness adjustment parameter of the corresponding preview image based on the bright-point weighting value, the dark-point weighting value, the bright-point average difference and the dark-point average difference;

wherein the determining the bright-point weighting value and the bright-point average difference based on the first bright point set and the second bright point set comprises:

determining an average value of grayscale values of all of first bright points in the first bright point set to obtain a subject bright-point average value, and determining an average value of grayscale values of all of second bright points in the second bright point set to obtain a background bright-point average value;

calculating a difference between the subject bright-point average value and the background bright-point average value to obtain the bright-point average difference;

determining an image center in the subject grayscale image;

determining a first distance value between each of the first bright points in the first bright point set and the image center point, and determining a second distance between each of the second bright points in the second bright point set and the image center;

determining a weight corresponding to the first bright point based on the first distance value, and determining a weight corresponding to the second bright point based on the second distance value;

calculating a product of the weight of each of the first bright points and the bright-point average difference, and calculating a product of the weight of each of the second bright points and the bright-point average difference;

calculating an average value of a sum of all the products to obtain the bright-point weighting value.

7. The non-transitory computer readable storage medium of claim 6, wherein the instructions are applicable to be loaded by the processor to execute the steps of:

performing a grayscale processing on each of the preview images to obtain a grayscale image correspondingly; and performing image segmentation on the grayscale image to obtain the subject grayscale image and the background grayscale image that correspond to the grayscale image.

8. The non-transitory computer readable storage medium of claim 6, wherein the instructions are applicable to be loaded by the processor to execute the steps of:

taking pixels with grayscale values lower than a brightness threshold in the subject grayscale image as first dark points to obtain the first dark point set; and taking pixels with grayscale values not lower than the brightness threshold in the subject grayscale image as first bright points to obtain the first bright point set.

9. The non-transitory computer readable storage medium of claim 6, wherein the instructions are applicable to be loaded by the processor to execute the steps of:

calculating a difference between the bright-point weighting value and the bright-point average difference to obtain a first difference value, and determining the first brightness adjustment parameter of the first bright point set and the second bright point set based on the first difference value; and calculating a difference between the dark-point weighting value and the dark-point average difference to obtain a second difference value, and determining the second brightness adjustment parameter of the first dark point set and the second dark point set based on the second difference value.

10. The non-transitory computer readable storage medium of claim 9, wherein the instructions are applicable to be loaded by the processor to execute the steps of:

using the first brightness adjustment parameter to perform brightness adjustment on the first bright point set and the second bright point set and using the second brightness adjustment parameter to perform brightness adjustment on the first dark point set and the second dark point set to adjust the preview image; and fusing the plurality of preview images that are adjusted into a single image to obtain a fused image.

11. A mobile terminal, comprising a processor and a storage that are electrically connected to each other, wherein the storage is configured to store instructions and data, and the processor is configured to execute the following steps:

obtaining a plurality of continuously-captured preview images when the mobile terminal starts a dynamic image capture mode;

determining a subject grayscale image and a background grayscale image that correspond to each of the preview images;

determining a brightness adjustment parameter of a corresponding preview image based on the subject grayscale image and the background grayscale image; and fusing the plurality of preview images based on the brightness adjustment parameters, wherein the processor is configured to execute:

determining a first bright point set and a first dark point set in the subject grayscale image and a second bright point set and a second dark point set in the background grayscale image;

determining a bright-point weighting value and a bright-point average difference based on the first bright point set and the second bright point set, and determining a dark-point weighting value and a dark-point average difference based on the first dark point set and the second dark point set; and determining the brightness adjustment parameter of the corresponding preview image based on the bright-point weighting value, the dark-point weighting value, the bright-point average difference and the dark-point average difference;

wherein the determining the bright-point weighting value and the bright-point average difference based on the first bright point set and the second bright point set comprises:

determining an average value of grayscale values of all of first bright points in the first bright point set to obtain a subject bright-point average value, and determining an average value of grayscale values of all of second bright points in the second bright point set to obtain a background bright-point average value;

calculating a difference between the subject bright-point average value and the background bright-point average value to obtain the bright-point average difference;

determining an image center in the subject grayscale image;

determining a first distance value between each of the first bright points in the first bright point set and the image center point, and determining a second distance between each of the second bright points in the second bright point set and the image center;

determining a weight corresponding to the first bright point based on the first distance value, and determining a weight corresponding to the second bright point based on the second distance value;

calculating a product of the weight of each of the first bright points and the bright-point average difference, and calculating a product of the weight of each of the second bright points and the bright-point average difference;

calculating an average value of a sum of all the products to obtain the bright-point weighting value.

12. The mobile terminal of claim 11, wherein the processor is configured to execute:

performing a grayscale processing on each of the preview images to obtain a grayscale image correspondingly; and performing image segmentation on the grayscale image to obtain the subject grayscale image and the background grayscale image that correspond to the grayscale image.

13. The mobile terminal of claim 11, wherein the brightness adjustment parameter comprises a first brightness adjustment parameter and a second brightness adjustment parameter, and the processor is configured to execute:

calculating a difference between the bright-point weighting value and the bright-point average difference to obtain a first difference value, and determining the first brightness adjustment parameter of the first bright point set and the second bright point set based on the first difference value; and calculating a difference between the dark-point weighting value and the dark-point average difference to obtain a second difference value, and determining the second brightness adjustment parameter of the first dark point set and the second dark point set based on the second difference value.

14. The mobile terminal of claim 13, wherein the processor is configured to execute:

using the first brightness adjustment parameter to perform brightness adjustment on the first bright point set and the second bright point set and using the second brightness adjustment parameter to perform brightness adjustment on the first dark point set and the second dark point set to adjust the preview image; and fusing the plurality of preview images that are adjusted into a single image to obtain a fused image.

* * * * *